Figure 1:
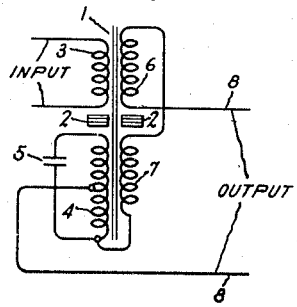

Jan. 13, 1948.  L. J. GBURSKI  2,434,493

VOLTAGE STABILIZING TRANSFORMER

Filed Feb. 17, 1945

Inventor:
Leonard J. Gburski,
by Harry E. Dunham
His Attorney.

Patented Jan. 13, 1948

2,434,493

UNITED STATES PATENT OFFICE 2,434,493

VOLTAGE STABILIZING TRANSFORMER

Leonard J. Gburski, Fort Wayne, Ind., assignor to General Electric Company, a corporation of New York Application February 17, 1945, Serial No. 578,413

6 Claims. (Cl. 171—777)

This invention relates to transformers and more particularly to improvements in compensated one-core type static voltage regulating transformers.

Such regulating transformers are sometimes called voltage stabilizers as they are adapted to convert a variable supply voltage into a constant load voltage, which load voltage is also independent of load magnitude variations. An example of such a stabilizer, and one upon which this invention is an improvement, forms the subject matter of Patent No. 2,432,343, dated Dec. 9, 1947, in the name of T. T. Short and assigned to the assignee of this application. The short stabilizer comprises a transformer having magnetic shunts between its primary and secondary winding so as to cause the transformer to have an abnormally high leakage reactance. A capacitor is associated with the secondary winding of the transformer and is tuned to near resonance therewith for the purpose of saturating the portion of the core on which the secondary winding is mounted. Saturation permits relatively wide changes in ampere turns of the secondary winding with relatively small variations in voltage. In effect, the difference between the exciting current of the secondary winding necessary to saturate the core and the capacitor core is drawn through the leakage reactance of the transformer, and the capacitor current is greater than the reactive current so that the net current drawn through the leakage reactance of the transformer is leading and the voltage drop through the leakage reactance of the transformer produced by the combination of this leading reactive current and the load current is used to produce the major portion of the stabilized secondary voltage. However, in order to compensate for the voltage drop or regulation which results from the fact that the saturation characteristic of the core is not absolutely perpendicular to the voltage axis, windings are placed on the magnetic shunts of the core and these are connected in series with the secondary winding so that a voltage is inserted in the output circuit which is proportional to the leakage reactance voltage of the transformer and this voltage when added vectorially to the voltage of the secondary winding produces a substantially constant output voltage with reasonable variations in input voltage and with variations in load between zero and full load at any particular power factor. As for balanced and symmetrical operation it is preferable to have at least two magnetic shunts, for the same reasons it is therefore preferable to have two compensating windings, one on each magnetic shunt. These compensating windings or coils being on a different portion of the core from the main windings, it is difficult to stack the core laminations into all the windings or coils.

In accordance with one of the principal features of this invention, equivalent compensating voltages are obtained without having the compensating windings on the magnetic shunts. This is accomplished by having the compensating windings closely coupled respectively with the primary and the secondary winding of the transformer and connecting them in series with each other and with the secondary winding of the transformer. These compensating windings have equal turns and they are so connected with respect to each other that the voltages induced in them by the mutual flux of the transformer are equal and opposite and thus cancel each other, while the voltages induced in them by the leakage flux of the primary and secondary windings are additive. The number of turns of the compensating windings is so chosen that the sum of the voltages induced in them by the leakage fluxes of the transformer is equal to the proper compensating voltage, that is to say, it is equal to the proper fraction of the leakage reactance voltage of the transformer.

It should be understood, however, that this invention is not limited to any particular size of the equal compensating windings, nor is it limited to connecting them in circuit with any particular main winding of the transformer. Thus, if they are equal in turns to the primary winding and are connected in series with the primary winding they can be made to compensate for the leakage reactance voltage drop in the transformer, and, likewise, if they are made equal in turns to the turns of the secondary winding and are connected in series with the secondary winding they can also be made to compensate for the leakage reactance voltage drop in the transformer. It will also be seen, therefore, that the invention is not limited to any particular transformer use or application.

An object of the invention is to provide a new and improved transformer.

A further object of the invention is to provide a new and improved one-core type compensated static voltage regulating transformer.

The invention will be better understood from the following description taken in connection with the accompanying drawing and its scope will be pointed out in the appended claims.

Figure 2:
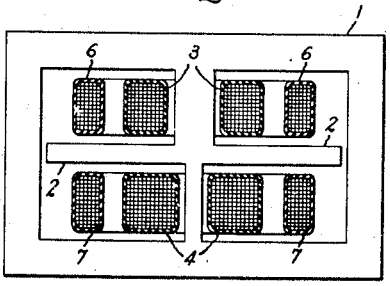
Figure 3:
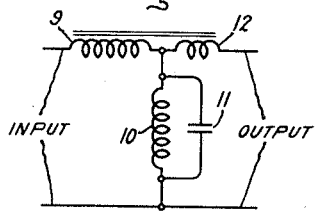
Figure 4:
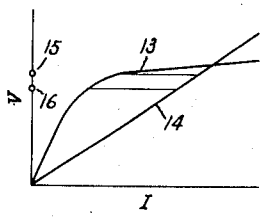
Figure 5:
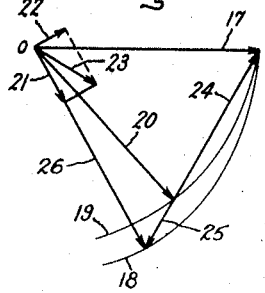

In the drawing Fig. 1 illustrates diagrammatically an embodiment of the invention, Fig. 2 is a sectional view of a transformer embodying the invention, Fig. 3 is an equivalent circuit diagram of the circuit shown in Fig. 1, Fig. 4 is a set of volt-ampere characteristics for explaining the operation of the invention, and Fig. 5 is a vector diagram for further explaining the operation of the invention.

Referring now to the drawing and more particularly to Fig. 1, there is shown therein a transformer having a core 1 which is provided with magnetic shunts 2. A primary winding 3 is located on one section of the core and a secondary winding 4 is located on another section of the core with the magnetic shunts between them. A capacitor 5 is connected across the secondary winding 4 and is tuned to near resonance with this winding so that a relatively large current circulates in the secondary winding 4 and the capacitor 5, and the input or primary winding circuit carries a current which is proportional to the difference between the two currents in the secondary winding 4 and the capacitor 5 when no other load is connected to the secondary winding. Also mounted on the two winding receiving sections of the core are auxiliary or compensating windings 6 and 7 which are thus relatively closely coupled respectively with the primary and secondary windings. These windings are shown reversely connected in series with each other and in series with a portion of the secondary winding 4 in what constitutes the output circuit 8 of the transformer.

The windings 6 and 7 are equal in turns so that the voltages induced in them by the common or mutual flux threading both the primary and the secondary winding will be equal and, as they are reversely connected, these voltages cancel each other in the output circuit. However, the leakage flux of the primary winding and the secondary winding will produce opposite voltages in these windings and as they are reversely connected these voltages will be additive in the output circuit. As will be explained in connection with the description of the operation, these voltages when added to the voltage of the secondary winding 4 produce a more constant output voltage. As windings 4 and 7 link the same flux and are connected in series it will be obvious to those skilled in the art that physically separate windings are unnecessary and either one can be an extension of the other, as by providing a suitably located tap in either one. Electrically, however, windings 4 and 7 are separate.

In Fig. 2 the parts of the transformer have been shown in a preferred structural relationship in which similar parts are designated by the same reference characters as are used in Fig. 1.

The operation of the invention is as follows: A well-known equivalent circuit of a transformer consists of a circuit having a series reactor and a shunt reactor, the latter being connected on the load side of the series reactor. The series reactor represents the leakage reactance of the transformer, and the shunt reactor represents its magnetizing reactance. Such an equivalent circuit is shown in Fig. 3 in which the series reactor 9 represents the leakage reactance of the transformer shown in Fig. 1, and the parallel combination of a reactor 10 and a capacitor 11 represents the effective magnetizing reactance of the transformer shown in Fig. 1. The winding 12 in Fig. 3 represents the two compensating windings 6 and 7 of Fig. 1, as the voltage of the winding 12 will be proportional to the voltage of the reactor 9 and is therefore proportional to the leakage reactance drop in the transformer.

Fig. 4 shows the volt-ampere relations of a parallel reactor and capacitor which are operating near resonance and thus it represents the volt-ampere relations of the elements 10 and 11 of Fig. 3, curve 13 being a typical magnetization curve of iron and the straight line 14 being the linear volt-ampere characteristic of a capacitor. The point where these curves intersect is the resonance point and at this point both the reactor and the capacitor are carrying a relatively high current but as the two currents are equal to each other and of course opposite in phase their resultant current is zero. It will be seen from this curve that with very slight decreases in voltage below the point corresponding to resonance the difference between the currents, that is to say, between the abscissae of characteristics 13 and 14, will increase very rapidly, and it will also be noted that this difference or resultant current is a wattless leading current because of the fact that the capacitor current is greater than the reactor current. The normal operating range of the stabilizer circuit is between the voltage 15 which is very close the resonance point and a slightly lower voltage 16 which is still above the knee of the saturation characteristic 14 and it is the relatively large changes in wattless leading current accompanying this small change in voltage between points 15 and 16 in Fig. 4 which when drawn through the series reactor 9 produce the primary regulating action of the stabilizer.

Referring now to Fig. 5, the horizontal vector 17 represents 100 per cent input voltage to the circuits shown in Figs. 1 and 3. The arc 18 is the arc of a circle drawn about the origin O of the vector 17, whereas the arc 19 represents the voltage across the windings 4 and 10 in Figs. 1 and 3 respectively under different operating conditions of the circuit, that is to say, different values of load current or input voltage. Vector 20 corresponds to the voltage of windings 4 and 10 in Figs. 1 and 3 respectively under full-load unity power factor conditions, for example, and the radial distance in the direction of vector 20 between arcs 18 and 19 corresponds with the voltage difference between points 15 and 16 in Fig. 4. Vector 21 lying along the voltage vector 20 represents the unity power factor load current, and vector 22 leading vector 20 by 90 degrees represents the leading current drawn by the parallel reactor-capacitor combination, that is to say, it represents the horizontal distance between curves 13 and 14 in Fig. 4 at voltage 16. The vector resultant 23 of these two currents produces a voltage drop in the reactor 9 or leakage reactance of the transformer shown in Fig. 1, which voltage leads the current 23 by 90 degrees so that it is represented by vector 24 in Fig. 5. As will be seen from this figure, the sum of vectors 20 and 24 equals the input voltage 17. The vector 25 is the voltage of the winding 12 in Fig. 3 which is also the sum of the leakage flux produced voltages in windings 6 and 7 of Fig. 1 and, as will be seen, it is 180 degrees out-of-phase or opposite in phase with the leakage reactance drop in the transformer. The sum of voltage vectors 20 and 25 equals the constant output or load voltage vector 26 which, it will be seen, is equal to 100 per cent load voltage.

Reductions in load current cause reductions in voltage drop in the leakage reactance of the transformer, thus increasing the voltage across the resonant portion of the circuit, with the result that its wattless leading current decreases so that the leakage reactance voltage drop changes in both magnitude and phase but the elements are so proportioned that the sum of vectors 20 and 25, that is to say, the output voltage 26 stays substantially on the arc 18 which is the locus of 100 per cent output voltage. A corresponding action takes place when the input voltage varies. In this case the load component of current stays constant but the leading wattless component of current drawn through the leakage reactance of the transformer varies very rapidly with very small changes in input voltage so that the vectors change their phase relations and also their magnitude relations in such a manner that the resultant or output voltage 26 stays substantially on the arc 18.

While the output circuit of the stabilizer shown in Fig. 1 has not been shown as being provided with frequency compensating means, or power factor compensating means, or harmonic filtering means, it will be understood that any and all of these auxiliary elements can be added to the circuit if and when desired. Such auxiliary devices form no part of the present invention and it is therefore believed unnecessary to show them.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. A compensated voltage stabilizing transformer comprising, in combination, a unitary magnetic transformer core having separate winding receiving sections which are separated by magnetic shunts, a primary winding on one section, a secondary winding on the other section, a capacitor coupled to said secondary winding and tuned to near resonance therewith for saturating the secondary receiving core section, and a pair of equal auxiliary windings mounted respectively on said core sections, said auxiliary windings being connected in series with each other and in series with said secondary winding, the relative polarity of said auxiliary windings being such that the voltages induced in them by the leakage flux of said primary and secondary windings are additive.

2. A compensated voltage stabilizing transformer comprising, in combination, a unitary magnetic transformer core having separate winding receiving sections which are separated by magnetic shunts, a primary winding on one section, a secondary winding on the other section, a capacitor coupled to said secondary winding and tuned to near resonance therewith for saturating the secondary receiving core section, and a pair of equal auxiliary windings mounted respectively on said core sections, said auxiliary windings being connected in series with each other and in series with said secondary winding, the relative polarity of said auxiliary windings being such that the voltages induced in them by the leakage flux of said primary and secondary windings are additive, the number of turns of said auxiliary windings being substantially less than the number of turns of said secondary winding.

3. A compensated voltage stabilizing transformer comprising, in combination, a unitary magnetic transformer core having separate winding receiving sections which are separated by magnetic shunts, a primary winding on one section, a secondary winding on the other section, a capacitor coupled to said secondary winding and tuned to near resonance therewith for saturating the secondary receiving core section, and a pair of equal auxiliary windings mounted respectively on said core sections, said auxiliary windings being connected in series with each other and in series with said secondary winding, the relative polarity of said auxiliary windings being such that the voltages induced in them by the leakage flux of said primary and secondary windings are additive, the phase of said voltages being opposite to the phase of the leakage reactance voltage drop through said transformer.

4. A transformer having, in combination, a main primary winding, a main secondary winding, and a pair of equal auxiliary windings, one of said auxiliary windings being relatively closely coupled to said primary windings and relatively loosely coupled to said secondary winding, the other auxiliary winding being relatively closely coupled to said secondary winding and relatively loosely coupled to said primary winding, said auxiliary windings being serially connected in circuit with one of said main windings.

5. A transformer having, in combination, a pair of main windings, a leakage flux path magnetically between said windings for giving said transformer a relatively high leakage reactance, and a pair of equal auxiliary windings, said auxiliary windings being respectively adjacent said main windings and being magnetically separated by said leakage flux path, said auxiliary windings being serially connected with each other in series with one of said main windings, the polarity of said auxiliary windings due to the leakage flux of their associated main windings being additive.

6. A transformer having, in combination, a main primary winding, a main secondary winding, means for providing a leakage flux path for said windings whereby said transformer has an abnormally high leakage reactance, and a pair of equal auxiliary windings, one of said auxiliary windings being mounted closer to the primary winding than it is to the secondary winding whereby it is more closely coupled to the primary winding than it is to the secondary winding, the other auxiliary winding being mounted closer to said secondary winding than it is to said primary winding whereby it is more closely coupled to the secondary winding than it is to the primary winding, said auxiliary windings being serially connected in circuit with said secondary winding, the polarity of the auxiliary winding which is most closely coupled to the secondary winding being additive with respect to the polarity of the secondary winding, the polarity of the other auxiliary winding being in opposition of the polarity of the secondary winding.

LEONARD J. GBURSKI.

REFERENCES CITED

The following references are of record in the file of this patent:

UNITED STATES PATENTS

| Number | Name | Date |
| --- | --- | --- |
| 2,143,745 | Sola | Jan. 10, 1939 |
| 2,276,032 | Gibbs | Mar. 10, 1942 |